(12) United States Patent  (10) Patent No.: US 7,553,396 B1
Miller                    (45) Date of Patent: *Jun. 30, 2009

(54) PRESSURE DESALINATION

(76) Inventor: Joel Vance Miller, 5158 Moccasin Way - 1, Antioch, CA (US) 94531

( * ) Notice: Subject to any disclaimer, the term of this patent is extended or adjusted under 35 U.S.C. 154(b) by 0 days.

This patent is subject to a terminal disclaimer.

(21) Appl. No.: 12/154,177

(22) Filed: May 20, 2008

(51) Int. Cl.
*B01D 3/10* (2006.01)
*C02F 1/04* (2006.01)
*B01D 3/28* (2006.01)

(52) U.S. Cl. .............. 202/182; 159/24.1; 159/DIG. 16; 202/205; 203/10; 203/11; 203/91; 203/DIG. 17

(58) Field of Classification Search ............ 159/5, 159/24.1, 26.2, 49, DIG. 15, DIG. 16; 202/160, 202/182, 186, 188, 205, 237, 238, 267.1; 203/2, 10, 11, 86, 87, 91, DIG. 17

See application file for complete search history.

(56) References Cited

U.S. PATENT DOCUMENTS 3,801,284 A * 4/1974 Meckler .................... 422/199
3,860,492 A * 1/1975 Lowi et al. ................. 202/236
3,956,072 A * 5/1976 Huse ......................... 202/177
4,880,504 A * 11/1989 Cellini et al. ............ 202/185.6
5,534,118 A * 7/1996 McCutchen ................ 202/205
5,729,987 A * 3/1998 Miller ......................... 62/98

* cited by examiner

*Primary Examiner*—Virginia Manoharan
(74) *Attorney, Agent, or Firm*—Robert Samuel Smith

(57) ABSTRACT

A system for generating purified water from polluted water which includes an entry chamber communicating with a source of polluted water, a pump for delivering water vapor from the entry chamber to the vapor chamber, and a passageway for delivering condensed water from the vapor chamber to a reservoir of purified water.

4 Claims, 4 Drawing Sheets

PRESSURE DESALINATION

FIELD OF THE INVENTION

This invention relates to desalination of salt water and particularly to water desalinated by a pressurized phase change.

BACKGROUND AND INFORMATION DISCLOSURE

A number of technologies have been investigated in the search to develop an economical method for desalinating water to satisfy the demand for fresh water.

For example, U.S. Pat. No. 6,695,951 to Bitterly et al discloses a series of rotating thin concentric shells which rotate at high velocity. Contaminated liquid is injected onto the surface of the shells. Centrifugal force causes the liquid to form a thin film along the inward-facing surface of the shell. A compressor lowers the pressure adjacent the thin film causing the liquid to boil. The compressor carries the vapor to the other side of the shells at a slightly higher temperature. There the vapor encounters the wall which is cooler because the heat was transferred to boil the contaminated liquid the vapor condenses and rotation throws the condensate against the adjacent wall where it is collected. Heat of condensation is transferred to the shell for boiling contaminated liquid.

This disclosure is characterized by a requirement for large kinetic energy of rotation that is necessary to sustain the process.

U.S. Pat. No. 6,699,369 discloses an apparatus that atomizes seawater using non-pneumatic nozzles. The seawater spray stream is directed into an evaporation chamber air, heated by waste heat is directed. The resultant micro-droplets undergo rapid evaporation resulting in the separation of salt solids from the vapor phase of the water. The mixture of suspended solids and water is filtered to remove and collect the salts. Water vapor is condensed to collect salt free water.

This system is characterized by a requirement to dissipate unused energy of condensation.

U.S. Pat. No. 6,833,056 discloses an apparatus including a heat exchanger cooperating with an evaporation can so as to subject raw water in the evaporation can to heat exchange and thereby generate water vapor in the evaporation can. A condenser cooperates with a raw water tank to receive water vapor from an evaporator can. Subjecting water vapor cools the water vapor and raw water in the raw water tank to heat exchange and thereby obtain distilled water.

In other widely used processes, reverse osmosis has gained the majority market share because of its superior cost performance.

Water produced by reverse osmosis remains an expensive process compared to natural water so the search goes on to satisfy an ever-growing demand.

Several types of reverse osmosis have been disclosed and are on the market. The popular commercial systems of choice (as judged in terms of market share) uses TEFLON™ as the membrane material for the reverse osmosis process. The membranes are manufactured by U.S.FILTERS, Inc.

The reverse osmosis systems are expensive to maintain and require up to 800 pounds per square inch to operate. These membranes last only a period of about seven years.

Furthermore, the toxic bacteria that builds up cannot be conveniently cleaned from the TEFLON membrane because the Teflon is degraded by cleansing compounds containing chlorine.

The transport of fluids (liquid and/or gas) relies heavily on the pump art.

Vapor displacement pumps are well known in the art of pumps as a class of pump that causes a fluid to move by trapping a fixed amount of fluid and then forcing (displacing) that trapped volume into the discharge pipe. Positive displacement pumps can be further classified as either rotary-type (for example the rotary vane) or lobe pumps similar to oil pumps used in car engines. Another common type is the Wendelkolben pump or the helical twisted Roots pump. The low pulsation rate and gentle performance of this Roots-type positive displacement pump is achieved due to a combination of its two 90° helical twisted rotors, and a triangular shaped sealing line configuration, both at the point of suction and at the point of discharge. This design produces a continuous and non-vorticule flow with equal volume. High capacity industrial "air compressors" have been designed to employ this principle as well as most "superchargers" used on internal combustion engines.

Reciprocating-type pumps use a piston and cylinder arrangement with suction and discharge valves integrated into the pump. Pumps in this category range from having "simplex" one cylinder, to in some cases "quad" four cylinders or more. Most reciprocating-type pumps are "duplex" (two) or "triplex" (three) cylinder. Furthermore, they are either "single acting" independent suction and discharge strokes or "double acting" suction and discharge in both directions. The pumps can be powered by air, steam or through a belt drive from an engine or motor. This type of pump was used extensively in the early days of steam propulsion (19th century) as boiler feed water pumps.

SUMMARY OF THE INVENTION

It is an object of this invention to provide an apparatus for desalinating water that is economical compared to competing systems.

It is also an object that the desalination process is amenable to producing desalinated water at a large rate.

This invention is directed toward an evacuated enclosure containing a system for admitting polluted water into an entry chamber of the system, a means for facilitating the withdrawal of water vapor from the polluted water entering the entry chamber. The entry chamber has one wall being a so-called barrier wall of the entry chamber inclined to horizontal. The polluted water flows as a film down the barrier wall forming an inside surface of the entry chamber. The vapor flows from the entry chamber into a vapor chamber then through a passageway. A portion of the surface of the passageway is the reverse side of the barrier wall (opposite the cascading water). so that heat of evaporation in the entry chamber on one side of the barrier wall is drawn as heat of condensation of vapor condensing as it passes through the passageway. The condensed (pure) water and any remaining vapor continues to be drawn by a pump at the exit end of the passageway where the condensed water is collected.

DISCUSSION OF THE DRAWINGS

Figure 1:
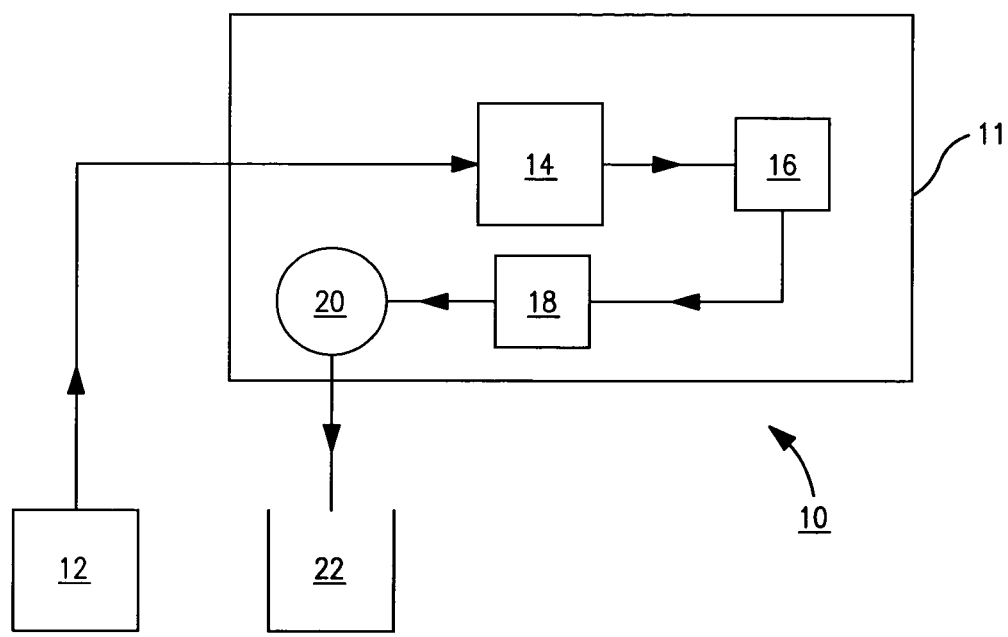
FIG. 1 is a schematic diagram of the system

Turning now to a discussion of the drawings, FIG. 1 is a schematic diagram of an enclosed system 10 for generating purified water from a source 12 of polluted water. and delivering purified water to a reservoir 22.

There are shown:

an air-tight enclosure 11 enclosing the entire system 10;

a source of polluted water 12;

Entry chamber 14 is connected directly to the source 12. Vapor is generated in entry chamber 14;

a vapor collection chamber 16 where vapor is collected;

a network of passageways 18 where the vapor condenses;

(the passageways are parts of a bounding wall which separates the entry chamber 14 from the vapor collection chamber 16: as discussed below;)

a pump 20 for generating a vacuum in the system to draw the current of water vapor and purified water from the entry chamber 14 through the vapor collection chamber 16 and condenser passageways 18 and then delivers the purified water to a collection tank 22.

FIGS. 2A,B are perspective schematic views showing details of flow from source 12 to entry chamber 14.

Figures 3, 4:
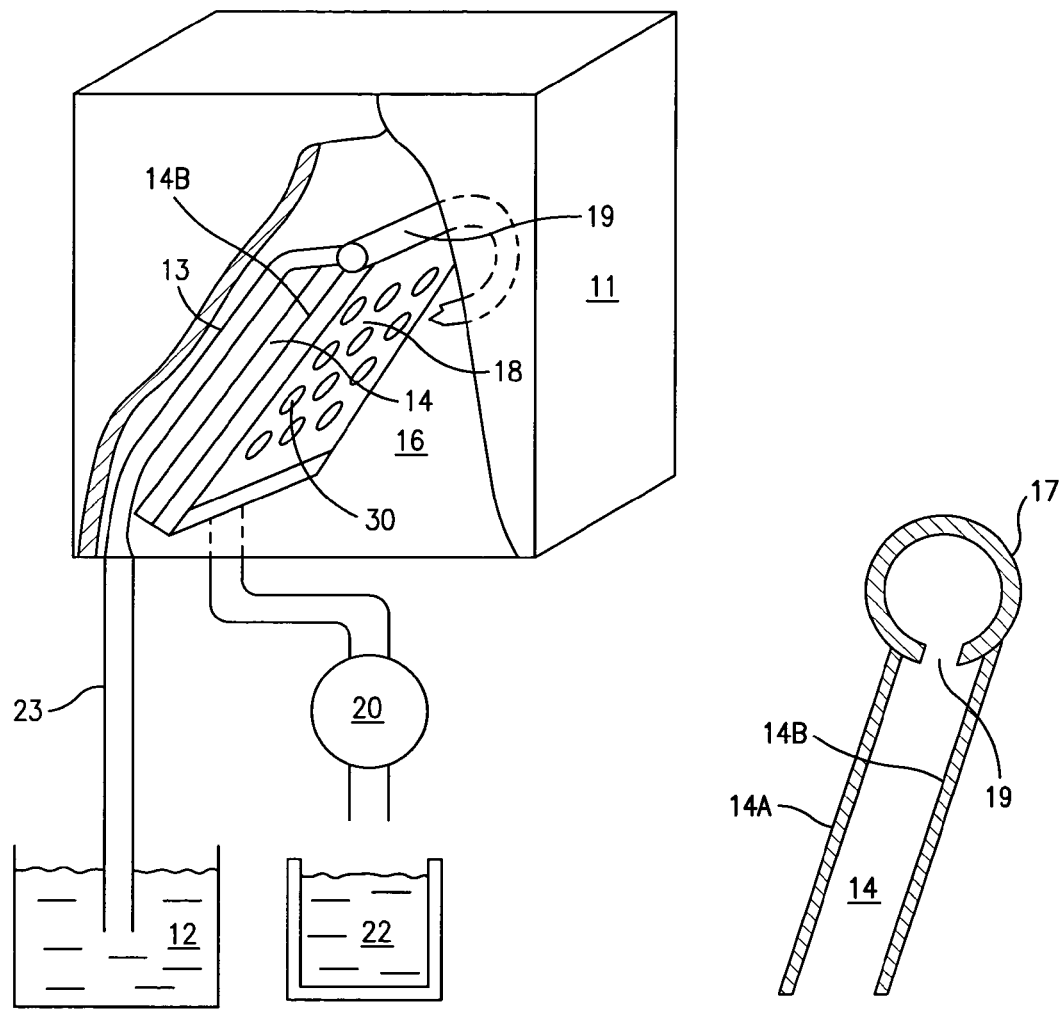
FIG. 3 is sectional view of the entry chamber showing the barrier wall
FIG. 4 is an assembly view of the system showing the array of passages

As shown in the sectional view of FIG. 3, the entry chamber 14 includes two parallel barrier walls 14A and 14B spaced close together and bounded along a top edge by a delivery tube 17.

Figure 2:
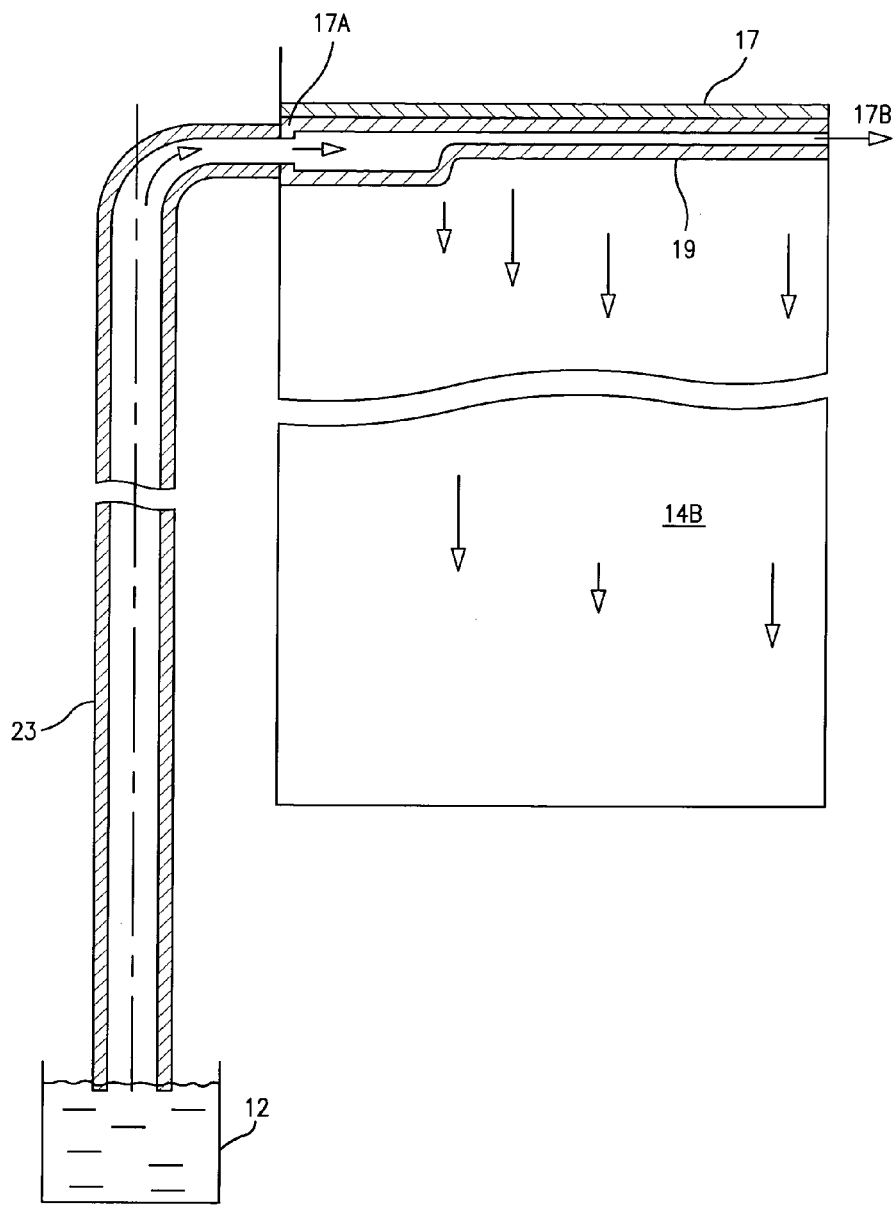
FIG. 2 shows the conduit configuration leading to the barrier panel for generating water vapor inside an entry chamber.

Only one barrier wall 14B, is shown in FIG. 2.

Source conduit 23 delivers polluted water from source 12 to one end of delivery tube 17 at the top of the barrier wall 14B of entry chamber 14.

Water flows into one end of delivery tube 17 positioned at the top edge of the barrier wall 14B inside entry chamber 14.

Referring to sectional view FIG. 3, the delivery tube 17 has an elongated opening 19 (either a row of holes or a slot) extending along the length of the tube 17.

As shown in FIGS. 2A,B, one end 17A of the tube 17 communicates with the source 12 of polluted When the (air) pressure in the entry chamber 14 is reduced (evacuated), water from source 12 flows through the tube 17 and out of slot 19 and cascades as a film down the inside surface of "so-called" barrier wall 14B. of entry chamber 14.

The flow of water cascading down the barrier wall 14B is controlled by the degree of vacuum in the entry chamber 14.

FIG. 4 is an assembly view of the system cutaway to show the entry chamber 14, the conduit 23 discussed with reference to FIG. 2. and the position of the passageways 18 relative to the entry chamber 14 and the vapor collection chamber 16, The edge of the barrier wall 14B is shown, on one side of which are the passageways 18 and on the other side of which is the entry chamber 14.

As shown in FIG. 4 the array (stack) of passageways 18 is positioned between the entry chamber 14 and the vapor collection chamber 16 in order that heat of condensation generated by condensation in the passageways 18 be delivered as heat of evaporation to the water running down the barrier surface 14B in the entry chamber 14.

Figure 5A:
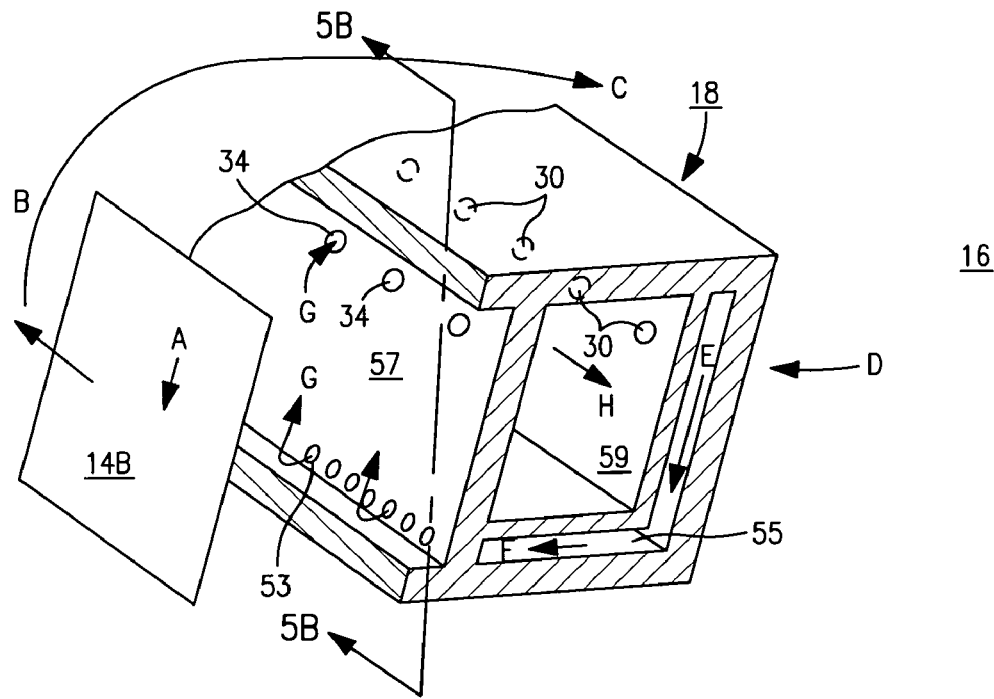
FIG. 5A shows a cutaway view of a single passageway.
Figure 5B:
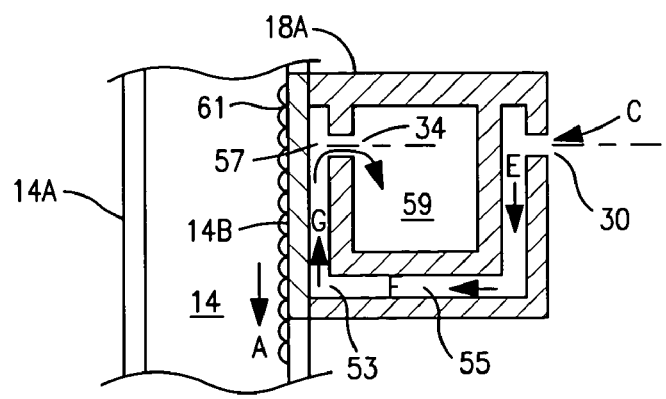
FIG. 5B shows a sectional view of a single passageway and entry chamber.

FIGS. 5A, B show details of a single passageway 18A. The arrows A B C D E F G H indicate the path of the fluid (water and vapor) through the passageway 18A into the conduit 59 leading to the reservoir 22 of pure water. (Reservoir 22 is not shown in FIGS. 5A, B.) The barrier wall 14B between the entry chamber 14 and passageway 18 is shown detached in FIG. 5A for clarity purposes.

Arrow A represents the flow of water down the face 14B of the barrier panel.

Arrow B represents flow of vapor off the surface of the film of water.

Arrow C represents the flow of vapor from the entry chamber 14 into the vapor chamber 16.

Arrow D represents flow from the vapor chamber 16 through orifices 30 (shown in phantom in FIG. 5A)) into the passageway 55.

Arrows E, F represent flow through the passageway 55 and out through openings 53

Arrow G represents flow of vapor out through openings 53 through passageway section 57 where strong condensation occurs because of the cooling effect of evaporation in the entry chamber 14.

As condensed vapor fills passageway section 57, purified water pours through openings 34 into central conduit 22 to the purified water reservoir 22 at the end of central conduit 59. Arrow H represents flow of (condensed) water in central conduit 59 into the reservoir 22 for pure water. Storage reservoir 22 is not shown in FIGS. 5A, B.

Variations and modifications of the invention may be contemplated after reading the specification and studying the drawings which are within the scope of the invention.

For example, the barrier wall 14D is selected to have a large heat conductivity such as copper.

In various embodiments, the enclosure 11 enclosing the system is one of concrete, metal, concrete reinforced by metal reinforcing bars, metal net.

The construction including the enclosure with the pump at the end of the enclosure (adjacent the reservoir of purified water) provides that water is drawn through the entire system from the reservoir of pure water to the reservoir of purified water.

In view of these and other modifications that are within the spirit of the invention, it is therefore wished to define the invention by the appended claims.

What is claimed is:

1. A system for converting polluted water from a reservoir for polluted water to purified water and delivering said pure water to a reservoir for purified water, said system comprising:

a conduit means for drawing polluted water from said reservoir of polluted water;

an entry chamber having an entry port communicating with said conduit means;

a vapor chamber communicating with said entry chamber;

a passageway having an entrance communicating with said vapor collection chamber;

a pump having an input communicating with said passageway and an output arranged for delivering purified water to said reservoir for purified water;

an air-tight enclosure enclosing said entry chamber, vapor collection chamber, passageway and pump; and said system arranged to provide that said pump reduces air pressure in said entry chamber, vapor collection chamber and passageway thereby drawing polluted water from said reservoir of polluted water, and drawing water vapor from said polluted water in said entry chamber, collecting said vapor in said vapor collection chamber, condensing said vapor to purified water in said passageway, and discharging said purified water into said reservoir for purified water;

a section of wall of said entry chamber is a barrier wall, bounding said entry chamber on one side of said barrier wall, and bounding said passageway on another side of said barrier wall;

said barrier wall positioned inclined to horizontal;

means for directing said polluted water to flow from a top boundary of said entry chamber inside said entry chamber down an inclined surface of said barrier wall providing that water vapor abetted by reduced air pressure, is generated from water flowing down said inclined surface in said entry chamber;

said pump drawing said vapor through said vapor collection chamber then into said passageway where condensation of said vapor generates purified water;

said purified water flowing through said pump to said reservoir of purified water;

said barrier wall is copper.

2. A system for converting polluted water from a reservoir for polluted water to purified water and delivering said purified water to a reservoir for purified water, said system comprising:

a conduit means for drawing polluted water from said reservoir of polluted water;

an entry chamber having an entry port communicating with said conduit means;

a vapor collection chamber communicating with said entry chamber;

at least one passageway having a passageway wall and leading from said vapor chamber;

a pump having an input communicating with said each one of said passageways and an output arranged for delivering purified water to said reservoir for purified water;

a section of said passageway wall of each one of said passageways being a section of a barrier wall between said entry chamber and said each one of said passageways providing that heat of condensation from water vapor condensing on one surface of said barrier wall facing said passageway is delivered as heat of evaporation to said one surface of said barrier wall in said entry chamber thereby supporting evaporation of said water flowing down said one surface of said barrier wall facing said entry chamber;

an air-tight enclosure enclosing said entry chamber, vapor collection chamber, passageway and pump; and said system arranged to provide that said pump reduces air pressure in said entry chamber, vapor collection chamber and passageway thereby drawing polluted water from said reservoir of polluted water, and drawing water vapor from said polluted water in said entry chamber, collecting said vapor in said vapor collection chamber, condensing said vapor to purified water in said passageway, and discharging said purified water into said reservoir for purified water.

3. The system of claim 2 wherein said barrier wall is plated with electroless nickel.

4. The system of claim 2 wherein said enclosure is a metal, concrete or concrete embedded by metal netting.

\* \* \* \* \*